United States Patent
Streffer

(10) Patent No.: US 9,969,760 B2
(45) Date of Patent: *May 15, 2018

(54) METHOD FOR LIGNIN RECOVERY

(71) Applicant: LXP Group GmbH, Marienwerder (DE)

(72) Inventor: Friedrich Streffer, Berlin (DE)

(73) Assignee: LXP GROUP GMBH, Marienwerder (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/909,841

(22) PCT Filed: Dec. 10, 2013

(86) PCT No.: PCT/EP2013/076054
§ 371 (c)(1),
(2) Date: Feb. 3, 2016

(87) PCT Pub. No.: WO2015/018463
PCT Pub. Date: Feb. 12, 2015

(65) Prior Publication Data
US 2016/0185809 A1    Jun. 30, 2016

(30) Foreign Application Priority Data

Aug. 6, 2013 (EP) .................................... 13179390

(51) Int. Cl.
*C07G 1/00* (2011.01)
*C08H 7/00* (2011.01)
*C08H 8/00* (2010.01)

(52) U.S. Cl.
CPC ................. *C07G 1/00* (2013.01); *C08H 6/00* (2013.01); *C08H 8/00* (2013.01)

(58) Field of Classification Search
CPC ............... C07G 1/00; C08H 6/00; C08H 8/00
See application file for complete search history.

(56) References Cited

U.S. PATENT DOCUMENTS

| 2,380,448 A * | 7/1945 | Katzen | ..................... C08H 6/00 106/123.11 |
| 8,895,290 B2 * | 11/2014 | Streffer | ..................... C08H 8/00 435/277 |

(Continued)

FOREIGN PATENT DOCUMENTS

| DE | 102010048614 A1 | 4/2012 |
| WO | WO-2010043424 A1 | 4/2010 |

(Continued)

OTHER PUBLICATIONS

Liu, Zehua, et al. "Separation of lignocellulosic materials by combined processes of pre-hydrolysis and ethanol extraction." Bioresource technology 102.2 (2011): 1264-1269.*

(Continued)

*Primary Examiner* — Nicholas E Hill
(74) *Attorney, Agent, or Firm* — Polsinelli PC

(57) ABSTRACT

The present invention primarily relates to a method for isolating lignin, preferably unmodified lignin, from a mixture, in particular a pulping slurry, containing lignin, a cellulose solvent, a cellulose precipitant, minerals and optionally (residual) cellulose and/or hemicellulose and/or hydrolyzation products thereof, comprising or consisting of the following steps:

i) removing the cellulose precipitant from the mixture,
ii) contacting the mixture with a lignin precipitant, preferably at a temperature below 50° C., to obtain a precipitate,
iii) removing the precipitate obtained in step ii) from the mixture,
iv) optionally washing the precipitate with a lignin precipitant,
v) removing the lignin precipitant from the precipitate,
vi) optionally separating the cellulose solvent and the lignin precipitant from the remaining mixture obtained in step iii)

(Continued)

with the proviso that in case the cellulose precipitant is the same as the lignin precipitant used in step ii) or contains one or more components of the mixture used as lignin precipitant in step ii), step i) is optional only.

20 Claims, 1 Drawing Sheet

(56) References Cited

U.S. PATENT DOCUMENTS

| | | | | |
|---|---|---|---|---|
| 2011/0201096 | A1* | 8/2011 | Streffer | C08H 8/00 435/277 |
| 2015/0176031 | A1* | 6/2015 | Streffer | C08H 8/00 435/150 |
| 2016/0185675 | A1* | 6/2016 | Streffer | C05F 7/02 71/23 |

FOREIGN PATENT DOCUMENTS

| | | | | |
|---|---|---|---|---|
| WO | WO 2011037967 A2 * | 3/2011 | | C07G 1/00 |
| WO | WO 2012161865 A1 * | 11/2012 | | D21C 11/0007 |

OTHER PUBLICATIONS

Khan, Tehmina Saleem, and Umarah Mubeen. "Wheat straw: a pragmatic overview." Current Research Journal of Biological Sciences 4.6 (2012): 673-675.*

Zehua Liu et al: "Separation of lignocellulosic materials by combined processes of pre-hydrolysis and ethanol extraction", Bioresource Technology, Elsevier BV, GB, vol. 102, No. 2, Aug. 18, 2010 (Aug. 18, 2010), pp. 1264-1269, XP028371548.

Minu K et al: "Isolation and purification of lignin and silica from the black liquor generated during the production of bioethanol from rice straw", Biomass and Bioenergy, Pergamon, Amsterdam, NL, vol. 39, Jan. 5, 2012 (Jan. 5, 2012), pp. 210-217, XP028464958.

International Search Report and Written Opinion, PCT/EP2013/076054.

* cited by examiner

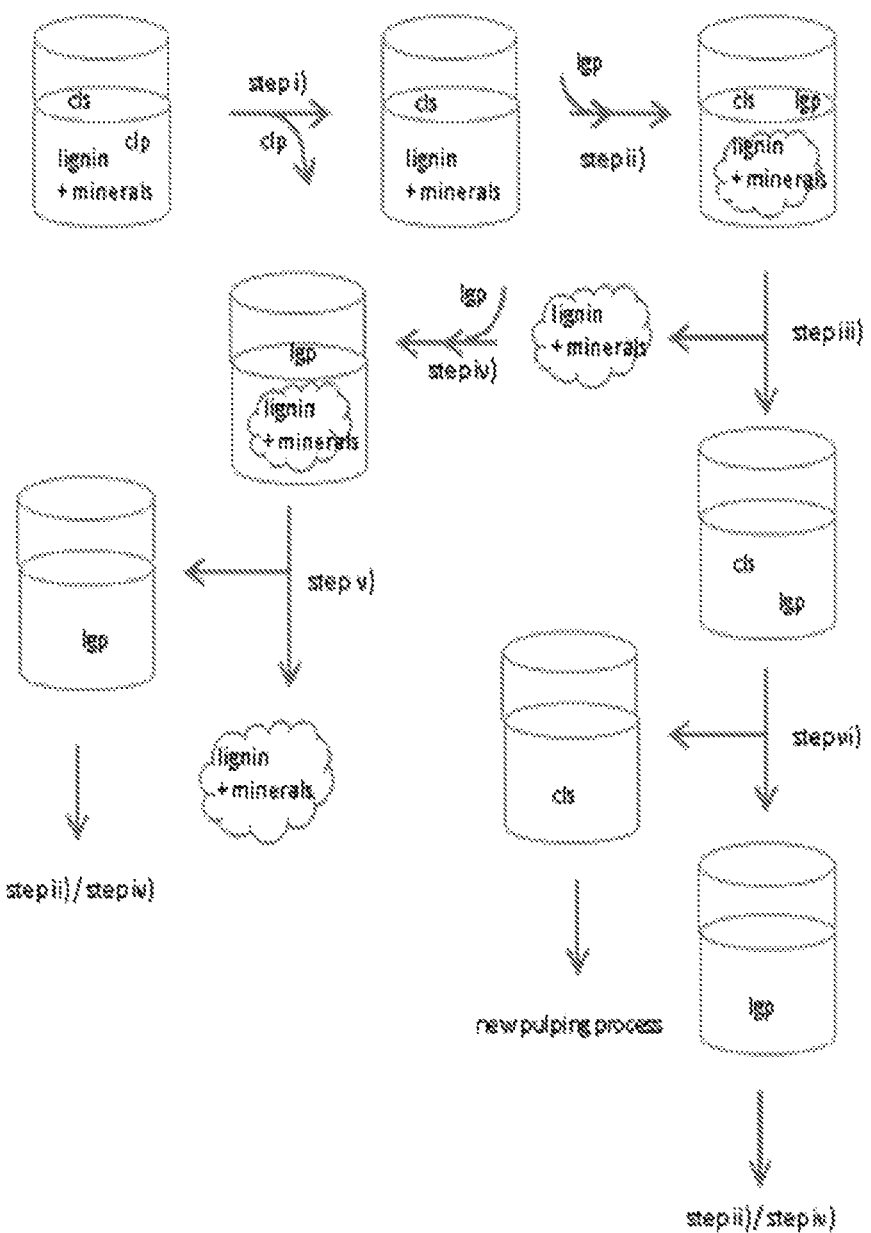

METHOD FOR LIGNIN RECOVERY

CROSS-REFERENCE TO RELATED APPLICATIONS

This application is a national stage application (under 35 U.S.C. § 371) of PCT/EP2013/076054, filed Dec. 10, 2013, which claims benefit of European Application No. 13179390.3, filed Aug. 6, 2013, which are incorporated herein by reference in their entireties.

The present invention primary relates to a method for recovering lignin (and, optionally, minerals) from a slurry obtained after the bulk of cellulose and hemicellulose has been removed from a lignocellulosic biomass. The method also allows simple recovery and reuse of the applied solvents and precipitants.

Pulping processes have previously been used to separate cellulose from lignin and other components of lignocellulose containing materials. For example, various types of inorganic chemicals in water have been used to modify lignin to render it water soluble. In the last decade various methods have been proposed to produce regenerated cellulose and hemicellulose while keeping the more or less unmodified lignin in solution and hence separate the cellulose/hemicellulose and the lignin by means of a solid/liquid separation. The solution system of the resulting slurry consists of a cellulose/hemicellulose solvent and a cellulose/hemicellulose precipitant and contains besides the lignin usually a substantial part of the minerals introduced into the process.

Recovering the lignin as well as the minerals from pulping processes is desirable for various reasons. First of all lignin is one of the few abundant providers of aromatic structures in nature rendering it valuable for chemical industry. Current research efforts focus on how unmodified lignin may be used. One example is the oxidation to vanillin. New investigations have shown that it is possible to produce carbon fibers in a reasonable quality and with a high market value from lignin, but the carbohydrate and sulfur content has to be very low. Secondly, lignin is the precursor for humus, the main factor controlling the water, carbon and mineral household of soil, providing a substantial value to agriculture. The importance of carbon- and mineral cycle closure has been recognized again in the last decades. And thirdly, lignin may act as a carbon dioxide sink, because it is degraded only very slowly and if kept anoxic and dry it is stable. Under suitable conditions it is converted to coal over time.

Furthermore, it is desirable to completely remove and/or recover the solvents and precipitants used in pulping processes as they may be expensive and/or ecologically harmful, which is detrimental to further uses of the products obtained from a pulping process.

A preferred method for digesting a biomass comprising lignin together with cellulose and/or hemicellulose comprises the following steps (cf. for example WO 2010/043424 A1):

First, the biomass is contacted with a solvent for dissolving the cellulose and/or the hemicellulose. This is preferably done at a temperature below 120° C. and below a pressure of 300 kPa for less than 4 hours. Secondly, the dissolved cellulose and/or hemicellulose are precipitated by contacting it/them with a precipitant to form a compact solid comprising cellulose and/or hemicellulose as well as possibly residual lignin. The precipitant may be selected from the group consisting of alkanes, ethers, and esters or a mixture of these and the precipitation is preferably performed at a temperature below 120° C. and at a pressure of below 300 kPa for less than 30 min. Thirdly, the precipitate may be contacted with a solvent for dissolving the lignin in the precipitate. This step can also be performed when precipitating the cellulose and/or hemicellulose.

The ratio of the solvent for dissolving the cellulose and/or the hemicellulose to the biomass may be about 5:1 (weight/weight), but can also be greater. The volumetric ratio of the solvent for dissolving the cellulose and/or the hemicellulose and the precipitant for precipitating cellulose and/or hemicellulose may range between 1:1 to 1:3 (volume/volume).

The biomass may be placed in a suitable container, in particular a reactor. As lignocellulose containing biomass, wood (hard or soft), forest trimmings, leaves, recycled paper, waste paper, paper waste, corn strover, corn fiber, wheat straw, rice straw, rye straw, sugarcane bagasse, sugar beet cuttings, switchgrass, bamboo, pulp and/or similar organic materials can be used. The lignocellulose containing material may be reduced in particle size to pieces of 1 cm or less and further treated, e.g. it may be washed and/or its water content is changed by means known to a person of skill in the art.

The solvent for dissolving the cellulose and/or the hemicellulose which is added to the biomass in the reactor can be an inorganic acid, an inorganic hydroxide, an ionic solution, an organic acid and water or a mixture of any of these (Klemm, 1998: Klemm, D., Philipp, B., Heinze, T., Heinze, U, Wagenknecht, U Comprehensive Cellulose Chemistry Vol. I, Weinheim, VCH-Wiley 1998).

The mixture of biomass and solvent may be stirred at a temperature between 30° C. and 90° C., but the temperature need not to be constant. The pressure is at normal ambient pressure, but may be varied. After 10 to 90 minutes, at least 60% of the cellulose and hemicellulose are dissolved, depending on the kind of biomass and the solvent used. The incubation time may be extended such that practically all of the cellulose and hemicellulose in the reactor is dissolved.

After completion of the cellulose/hemicellulose digestion as described above, the reaction is stopped using a precipitant for precipitating the cellulose and hemicellulose, thereby forming a compact solid (precipitate). A precipitant may be chosen from alkanes, ethers and/or esters or a mixture of these, which do not swell or only modestly swell cellulose. The liquid retention value (LRV) for the precipitant may be smaller than the LRV of water for the cellulose used, wherein the LRV is defined according to Klemm, 1998, page 237, as follows:

$$LRV\ (\%) = (\text{Mass of moist sample} - \text{Mass of dry sample}) \times 100 / \text{Mass of dry sample}$$

The volumetric ratio of the solvent and the precipitant is 1:1 to 1:3, reducing the solvent amount needed for this and the following step. For this step, the conditions of temperature and pressure are considered of minor importance. Therefore temperature and pressure may be maintained from the previous step. Subsequently, the solid and the liquid phase are separated from each other.

After the precipitate containing the bulk of the cellulose and hemicellulose is removed, the remaining slurry contains the solvent for dissolving the cellulose and/or the hemicellulose (from now on called the "cellulose solvent"), the precipitant for precipitating the cellulose and/or hemicellulose (from now on called the "cellulose precipitant") as well as lignin and minerals, both of which are for the most part dissolved. The mixture may also comprise residual cellulose and/or hemicellulose as well as hydrolysation products thereof.

Further aspects of a preferred method for digesting a biomass comprising lignin together with cellulose and/or hemicelluloses can be derived from WO 2010/043424 A1, the content of which is herewith incorporated in its entirety.

A primary objective of the present invention was to provide a method to isolate lignin, preferably together with minerals, in a cheap and energy efficient way from such a mixture (cf. above) without the use of expensive equipment.

A further objective of the present invention was to facilitate easy separation and recovery and/or reuse of the solvents and precipitants present in the starting mixture as well as the solvents and precipitants used in the method according to the invention as described below.

The objectives of the present invention as set out above are met by a method for isolating lignin, preferably unmodified lignin, and, optionally, minerals from a mixture, in particular a pulping slurry (preferably a mixture or, respectively, a pulping slurry obtained by a method as described in WO 2010/043424 A1), containing lignin, a cellulose solvent, a cellulose precipitant, minerals and optionally (residual) cellulose and/or hemicellulose and/or hydrolysation products thereof, comprising or consisting of the following steps:

i) removing the cellulose precipitant from the mixture,
ii) contacting the mixture with a lignin precipitant, preferably at a temperature below 50° C., to obtain a precipitate,
iii) removing the precipitate obtained in step ii) from the mixture,
iv) optionally washing the precipitate with a lignin precipitant,
v) removing the lignin precipitant from the precipitate,
vi) optionally separating the cellulose solvent and the lignin precipitant from the remaining mixture obtained in step iii), with the proviso that in case the cellulose precipitant is the same as the lignin precipitant used in step ii) or contains one or more components of the mixture used as lignin precipitant in step ii), step i) is optional only, i.e. step i) can be omitted.

Besides the lignin and the minerals, the mixture may contain residual cellulose and/or hemicellulose and/or hydrolysation products thereof. Among the hydrolysation products of cellulose and/or hemicellulose, xylose is commonly the most abundant. The total amount of residual carbohydrates may be up to 10 wt. %, preferably up to 1 wt. %, particularly preferably up to 0.1 wt. %, with respect to the dry weight of the mixture or, respectively, the slurry. The carbohydrate content is especially low in case of using water in step iv).

In step i) of the method according to the invention, the cellulose precipitant is removed from the mixture, while the lignin and minerals largely remain dissolved. Suitable methods to remove the cellulose precipitant, e.g. evaporation, are known to the skilled person.

It may be, however, that in step ii) the same substance as the cellulose precipitant removed in step i) or a mixture of components comprising the cellulose precipitant removed in step i) is used as lignin precipitant. In this case step i) may be skipped and in step ii) merely further lignin precipitant or further components to add up to the lignin precipitant are added. Substances with Hansen solubility parameters of polarity (P) and hydrogen bonding (H) both below 10 $MPa^{0.5}$ may be precipitants which can be used as cellulose as well as lignin precipitant. The Hansen solubility parameters (Hansen solubility parameters: a user's handbook.— 2nd ed./edited by Charles Hansen; CRC Press) indicate whether a solvent is a good solvent for a polymer or not. The Hansen theory states that any polymer or solvent may be described by three parameters D—Dispersion
P—Polarity
H—Hydrogen Bonds These three parameters span a space in which a polymer or a solvent (-mixture) is described by a point. Good solvents for a polymer are in the vicinity of the polymer in that space, which is described by a sphere around the point of the polymer of radius R.

The polymers cellulose and lignin are described by the parameters:

|  | D ($MPa^{0.5}$) | P ($MPa^{0.5}$) | H ($MPa^{0.5}$) |
| --- | --- | --- | --- |
| cellulose | 24.3 | 19.9 | 22.5 |
| lignin | 21.9 | 14.1 | 16.9 |

For the purposes of the invention it is enough to address the parameters P and H in a 2-dimensional space and therefore the sphere collapses to a circle. Following this methodology it is evident that the ionic liquid [bmim] Cl (1-Butyl-3-methylimidazoliumchlorid) with the parameters P=20.7 $MPa^{0.5}$ and H=20.7 $MPa^{0.5}$ and a distance to cellulose of ~2 $MPa^{0.5}$ is a reasonable solvent for cellulose but a poor solvent for lignin with a distance of 7.6 $MPa^{0.5}$.

Solubility parameters of mixtures are linear. That is, each of the Hansen Solubility Parameters (dispersion, polarity, and hydrogen bonds) of a solvent mixture is a linear function of composition. In this case, the composition value to be used in calculating the solubility parameters for solvent mixtures is the volume fraction f for each component of the mixture. For a binary (two-solvent) mixture, the equation of the solubility parameters is given by Equation 1 and x iterates over D, P and H $$X_{blend}=(f_1 * x_1)+(f_2 * x_2) \quad [1]$$

Knowing this it can be deduced that a good cellulose solvent (P and H around 20 $MPa^{0.5}$ or above) can be transformed to a bad cellulose and good lignin solvent (P and H about 15 $MPa^{0.5}$) and later on also to a bad lignin solvent (P and H near 10 $MPa^{0.5}$ or below) by adding successively more and more of a solvent with P and H below 10 $MPa^{0.5}$.

The mixture is preferably contacted with the lignin precipitant at a temperature below 50° C. to ensure the formation of a compact, solid precipitate containing the bulk of the lignin and preferably also the bulk of the minerals present in the mixture.

In step iii) the precipitate formed in step ii) is removed from the mixture by centrifugation, filtration or any other suitable methods known to the skilled person. Depending on the solution system present in the remaining mixture, a separation into two or more liquid phases may be possible which may be treated separately to recover the solvents/precipitants.

The precipitate may optionally be washed with further lignin precipitant to remove residual cellulose and/or hemicellulose. In the washing step iv), the same lignin precipitant used in step ii) or a different one may be used and the washing step may be repeated one or more times if applicable.

The lignin precipitant from step ii) and/or step iv) is removed from the precipitate in step v) by a suitable method, e.g. drying, to yield the lignin and, optionally, minerals.

Optionally, the cellulose solvent and the lignin precipitant are separated in step vi). The recovery of both, the cellulose solvent and the lignin precipitant advantageously allows reuse in a subsequent application and ensures economic efficiency of the process. Separation of the cellulose solvent and the lignin precipitant may be achieved by any suitable method, e.g. evaporation, as evident to a skilled person.

In a method according to the invention the order of the above described steps may be varied according to requirement and process integration. Depending on the combination of solvents and precipitants used, a skilled person is able to deduce which steps may be performed subsequently and/or at the same time.

The isolated lignin together with the minerals, if applicable, has a very low content of carbohydrates and residual solvent/precipitant. This opens up a range of further uses, among which the application as fertilizer is ecologically very valuable as it contributes to close the carbon and mineral cycle. If applicable, the minerals may also be removed by recrystallization from ethanol or acetone to yield pure lignin, which serves as a clean energy source, for example in combustion, because of its low ash and carbohydrate content and the absence of toxic (organic) solvents.

In a method according to the present invention, step ii) may be repeated one or more times using the remaining mixture obtained in step iii).

To ensure a complete precipitation of the lignin and, if applicable, the minerals, the mixture remaining after removal of the precipitate in step iii) may be subjected to the precipitation conditions of step ii) repeatedly.

The cellulose solvent obtained in step vi) of the method according to the invention may be reused to dissolve lignocellulose, preferably in a pulping process.

In the method according to the present invention, the cellulose solvent is substantially recovered from the mixture or, respectively, the pulping slurry and can advantageously be reused in a subsequent application.

Furthermore, the lignin precipitant obtained in step v) and/or step vi) of the method according to the invention may preferably be reused in a step ii) and/or a step iv) of a subsequently performed method according to the invention.

By reusing the lignin precipitant of the method according to the invention, economic efficiency of the process is guaranteed. Alternatively, the recovered lignin precipitant may also be used for any other subsequent application.

The lignin precipitant used in step ii) and/or step iv) of the method according to the invention may be selected from the group consisting of alkanes, ethers, esters, $CO_2$, water and mixtures thereof. Preferably the lignin precipitant used in step ii) and/or step iv) is selected from the group consisting of esters with less than 7 carbon atoms, ethers with less than 7 carbon atoms, $CO_2$, water and mixtures thereof, particularly preferably from the group consisting of DIPE (diisopropylether), ethyl acetate, MTBE (methyl tert-butyl ether) and $CO_2$.

In a particularly preferred embodiment of the present invention, the lignin precipitant used in step ii) is diisopropyl ether or ethyl acetate.

The use of diisopropyl ether or ethyl acetate as lignin precipitant facilitates the formation of a stable compact precipitate and thus ensures that most of the lignin together with the minerals, if applicable, can be recovered.

In a further preferred embodiment of the present invention, the lignin precipitant used in step ii) comprises or consists of $CO_2$, in particular pressurized or supercritical $CO_2$.

$CO_2$ is capable of forming hydrogen bridges with lignin and thereby promotes agglomeration and formation of a compact lignin precipitate, which facilitates removal of the precipitate from the mixture. Addition of $CO_2$ to a different lignin precipitant may also enhance compact precipitation of the bulk of the lignin present in the mixture.

In one embodiment of the present invention, the precipitation in step ii) of the method according to the invention is performed under pressurized conditions.

Especially in case the lignin precipitant contains components, which are gaseous under normal conditions (T=0° C. and P=1013 hPa), the application of pressure may enhance efficient precipitation. A pressure of more than 1 MPa, preferably more than 2 MPa, particularly preferably more than 3 MPa at a temperature of 20 to 50° C. may be applied.

The cellulose solvent present in the mixture used in a method of the invention may be selected from the group consisting of inorganic acids, inorganic hydroxides, organic acids, ammonia, hydrazine, ionic liquids and solutions of at least one transition metal complex and its mixtures and mixtures of any of the aforementioned compounds.

The cellulose solvent is preferably selected from the group consisting of inorganic acids, preferably sulfuric acids, hydrochloric acid, nitric acid, phosphoric acid, and polyphosphoric acid;

inorganic hydroxides, preferably potassium hydroxide, sodium hydroxide, lithium hydroxide;

organic acids, preferably formic acid, acetic acid, propionic acid, butyric acid;

ammonia, and hydrazine;

ionic solutions, preferably lithium chloride/N,N-dimethylacetamide, lithium bromide/N,N-dimethylacetamide, 1-butyl-3-methylimidazolium hexafluoro-phosphate, dimethylsulfoxide/tetrabutylammonium fluoride trihydrate;

solutions of at least one transition metal complex and its mixtures (preferably of two components), preferably of 1,2-ethylenediamine cadmium hydroxide (Cadoxen, $[Cd(H_2N-(CH_2)_2-NH_2)_3](OH)_2)$, cuprammonium hydroxide (Cuam, $[Cu(NH_3)_4](OH)_2)$, 1,2-ethylenediamine copper hydroxide (Cuen, $[Cu(H_2N-(CH_2)_2-NH_2)_2](OH)_2)$, 1,3-propylenediamine copper hydroxide (Cupren, $[Cu(H_2N-(CH_2)_3-NH_2)_2](OH)_2)$, 1,2-ethylenediamine palladium hydroxide (Pd-en, $[Pd(H_2N-(CH_2)_2-NH_2)](OH)_2)$, 1,2-ethylenediamine cobalt hydroxide (Cooxen, $[Co(H_2N-(CH_2)_2-NH_2)_2](OH)_2)$, Zincoxen, $[Zn(H_2N-(CH_2)_2-NH_2)_2](OH)_2)$, nickel ammonium hydroxide (Ni-oxam, $[Cu(NH_3)_6](OH)_2)$, 1,2-ethylenediamine nickel hydroxide (Nioxen, $[Ni(H_2N-(CH_2)_2-NH_2)_3](OH)_2)$, triaminoethyl-amine nickel hydroxide (Nitren, $[Ni(NH_2CH_2CH_2)_3N](OH)_2)$;

water; and a mixture of any of the beforementioned compounds.

It is preferred that the ionic solution or ionic liquid contains at least one ionic substance. Such an ionic substance can be of an annular or open-chain structure. The melting point of the substance is preferably below 100° C. The ionic liquid may contain at least one anion, such as a halogen ($Cl^-$, $Br^-$, and/or $I^-$), a carboxylate (e.g. acetate, formate, propionate, butyrate, citrate, oxylate, and/or maleate), or a phosphonate (methyl-phosphonate, and/or ethyl-phosphonate) or $PF^{6-}$ or $BF^{4-}$. The ionic liquid may contain at least one cation, such as (possibly alkylated) imidazolium, (possibly alkylated) pyrazolium, (possibly alkylated) ammonium, (possibly alkylated) cholinium, (possibly alkylated) piperidinium, or (possibly alkylated) pyrrolidinium. Preferably, the ionic liquid comprises or contains 1-butyl-3-methylimidazolium bromide, 1-allyl-3-methylimidazolium chloride, N-tributyl-N-methylammonium iodide, 1-ethyl-3-methylimidazolium formate, 1-ethyl-3-methylimidazolium acetate, choline acetate, N,N-dimethylbutanammonium formate, and/or N-methylpiperidinium butyrate.

Preferably the cellulose solvent present in the mixture used in a method of the invention is selected from the group consisting of phosphoric acid, polyphosphoric acid, Cuen, sulfuric acid, a mixture of HCl with concentrated acetic acid, or a mixture of formic acid and zinc chloride.

In a particularly preferred embodiment of the present invention, the cellulose solvent present in the mixture used in a method of the invention is phosphoric acid.

The cellulose precipitant present in the mixture used in a method of the invention is preferably selected from the group consisting of alkanes, ethers, esters, alcohols, aldehydes, ketones, organic acids, water and mixtures thereof. The cellulose precipitant is particularly preferably selected from the group consisting of alkanes, ethers and esters.

The alkanes used as a cellulose precipitant in the above described method are preferably alkanes with eight C-atoms or less, more preferably selected from the group consisting of pentane, hexane, cyclohexane, heptane, octane, and their isomers, either alone or in any mixture of the beforementioned alkanes. More preferred are the alkanes cyclopentane, hexane and cyclohexane.

The ethers used as cellulose precipitant in the present method can be ethers with eight C-atoms or less, preferably selected from the group consisting of methyl-tert. butylether (MtB ether), ethyl-tert. butylether (EtB ether), propyl-tert. butyl ether, butyl-tert. butyl ether, dimethyl ether, methyl ethyl ether, diethyl ether, methyl propyl ether, ethyl propyl ether, methyl butyl ether, methyl pentyl ether, ethyl butyl ether, dipropyl ether, methyl hexyl ether, ethyl pentyl ether, propyl butyl ether, methyl heptyl ether, ethyl hexyl ether, propyl pentyl ether, dibutyl ether, and their isomers, either alone or in any mixture of the beforementioned ethers. More preferred ethers are Mtb ether, Etb ether, Diethyl ether and dipropyl ether.

The esters used as cellulose precipitant are preferably esters with eight C-atoms or less, more preferably selected from the group consisting of methyl acetate, ethyl acetate, propyl acetate, butyl acetate, pentyl acetate, hexyl acetate, methyl formate, ethyl formate, propyl formate, butyl formate, pentyl formate, hexyl formate, heptyl formate, methyl propionate, ethyl propionate, propyl propionate, butyl propionate, pentyl propionate, methyl butyrate, ethyl butyrate, propyl butyrate, butyl butyrate, methyl pentanoate, ethyl pentanoate, propyl pentanoate, methyl hexanoate, ethyl hexanoate, and their isomers, either alone or in any mixture of the beforementioned esters. More preferred esters are methyl acetate, ethyl acetat, iso propyl acetate and ethyl formiate.

Preferably the cellulose precipitant present in the mixture used in a method of the invention is selected from the group consisting of alkanes, ethers, esters, alcohols, aldehydes, ketones, organic acids, water and mixtures thereof, particularly preferably from the group consisting of ethers, esters and mixtures thereof.

Preferably, by a method according to the invention a lignin containing preparation is obtained, which consist of lignin or which comprises
40-99.9 wt.-% of lignin, preferably unmodified lignin,
0.1-50 wt.-% of minerals, preferably 0.1-30 wt.-%
0-25 wt.-% of one or more mono- and oligomeric carbohydrates, preferably 0.1-20 wt.-% and
0-5 wt.-% of one or more solvents, in particular water, preferably 0.1-4 wt.-%
preferably
60-99 wt.-% of lignin,
1-20 wt.-% of minerals,
0-10 wt.-% of mono. and oligomeric carbohydrates, preferably 0.1-5 wt.-%, and
0-3 wt.-% of one or more solvents, preferably 0.1-2 wt.-%
particularly preferably
70-99 wt.-% of lignin,
1-10 wt.-% of minerals,
0-3 wt.-% of mono. and oligomeric carbohydrates, preferably 0.1-2 wt.-% and
0-0.5 wt.-%, preferably 0.1-0.5 wt.-% of one or more solvents.

If applicable, the minerals may be removed, e.g. by recrystallization, from ethanol or aceton to yield pure lignin, which may serve for example as a clean energy source, because of its low ash and carbohydrate content and the absence of toxic (organic) solvents.

The following FIGURE and the examples are added to illustrate the method according to the invention, without limiting the scope of protection.

FIG. 1: Schematic view of an exemplary method for isolating lignin from a mixture, containing lignin, a cellulose solvent (cls), and a cellulose precipitant (clp), using a lignin precipitant (lgp).

EXAMPLE 1

Method for Digesting Lignocelluloses Containing Biomass Using a Cellulose Solvent and a Cellulose Precipitant (to Obtain a Mixture to be Used in a Method According to the Present Invention)

Lignocellulose containing biomass in the form of 50 g of coarsely grained wheat straw was stirred with 300 ml 80% $H_3PO_4$ as cellulose solvent at 55° C. for 45 min to the complete solution of the straw. The black viscous medium was cooled to approx. 40° C. and then mixed vigorously with 600 ml of pre-cold MtB ether (methyl-tert. butylether) as a precipitant to give a compact precipitate of cellulose/hemicellulose. The solid phase was removed from the slurry.

EXAMPLE 2

Method for Digesting Lignocelluloses Containing Biomass Using a Cellulose Solvent and a Cellulose Precipitant in Combination with a Lignin Solvent (to Obtain a Mixture to be Used in a Method According to the Present Invention)

Lignocellulose containing biomass in the form of 30 g solid biogas digeatate were mixed with 200 ml 80% $H_3PO_4$ as cellulose solvent and stirred at 50° C. for 40 min. The solution is precipitated with 1 l pre-cold mixture of ethanol/acetone as precipitant with a ratio of 3:1. The solid phase (the precipitate) was separated by centrifugation and the supernatant was collected.

EXAMPLE 3

Method for Isolating Lignin from a Mixture Obtained According to Example 1 i) The organic cellulose precipitant was removed under reduced pressure of 400 mbar from the collected supernatant of example 1 to give a black viscous solution, which was cooled to 40° C.

ii) 10 ml of the black solution was mixed vigorously with 50 ml ethyl acetate, which readily formed a brown precipitate.

iii) The brown precipitate was filtered of. The filtrate was collected for later treatment.

iv) The solids were suspended in another 50 ml ethyl acetate and filtered again. The filtrate was collected for later use in a step ii).

v) The brown solids were dried at 65° C.

vi) The ethyl acetate was removed from the phosphoric acid by destillation leaving approx. 8 ml.

The regenerated acid of step vi) was able to dissolve 1.5 g of straw.

The carbohydrate and ash content of the solids of step v) were determined as well as the element composition of to confirm that the brown precipitate was lignin.

| Parameter | % of dry weight |
|---|---|
| Sample weight | 217 mg |
| Ash | 5% |
| Carbohydrate | 0.9% |
| Lignin | 90% |
| Elementary analysis: | |
| C | 64.8% |
| H | 4.5% |
| O | 28.8% |
| N | 0.8% |
| S | 0.4% |

EXAMPLE 4

Method for Isolating Lignin from a Mixture Obtained According to Example 2 i) The organic cellulose precipitant was removed under reduced pressure of 500 mbar from the collected supernatant of example 2 to give a black viscous solution, which was cooled to 40° C.

ii) 20 ml of the black solution was mixed vigorously with 40 ml di-propyl ether, which readily formed a brown precipitate.

iii) The brown precipitate was filtered of. The filtrate was collected for later treatment.

iv) The solids were suspended in another 40 ml di-propyl ether and filtered again. The filtrate was collected for later use in a step ii). The brown solids were washed with 20 ml hot water.

v) The brown solids were dried at 65° C.

vi) The di-propyl ether was removed from the phosphoric acid by destillation leaving approx. 17 ml.

The regenerated acid of step vi) was able to dissolve 2.5 g of straw.

The carbohydrate and ash content of the solids of step v) were determined.

| Parameter | % of dry weight |
|---|---|
| Sample weight | 750 mg |
| Ash | 18% |
| Carbohydrate | <0.1% |
| Lignin | 81% |
| Elementary analysis: | |
| C | 62.5% |
| H | 5% |
| O | 29% |
| N | 1% |
| S | 0.2% |

The invention claimed is:

1. A method for isolating lignin from a mixture comprising lignin, a cellulose solvent, a cellulose precipitant, minerals, and optionally cellulose and/or hemicellulose and/or hydrolysation products thereof, wherein the mixture comprises a total amount of cellulose, hemicellulose, and hydrolysation products thereof up to 1 wt. % with respect to the dry weight of the mixture, the method comprising the following steps:
   i) removing the cellulose precipitant from the mixture,
   ii) contacting the mixture with a lignin precipitant to obtain a precipitate,
   iii) removing the precipitate obtained in step ii) from the mixture,
   iv) optionally washing the precipitate with a lignin precipitant,
   v) removing the lignin precipitant from the precipitate,
   vi) optionally separating the cellulose solvent and the lignin precipitant from the remaining mixture obtained in step iii);
       with the proviso that in case the cellulose precipitant is the same as the lignin precipitant used in step ii) or contains one or more components of the mixture used as lignin precipitant in step ii), step i) is optional only.

2. The method according to claim 1, wherein step ii) is repeated one or more times using the remaining mixture obtained in step iii).

3. The method according to claim 1, wherein the cellulose solvent obtained in step vi) is reused to dissolve lignocellulose.

4. The method according to claim 1, wherein the lignin precipitant obtained in step v) and/or step vi) is reused in step ii) and/or a step iv).

5. The method according to claim 1, wherein the lignin precipitant used in step ii) and/or step iv) is selected from the group consisting of alkenes, ethers, esters, $CO_2$, water, and mixtures thereof.

6. The method according to claim 5, wherein the lignin precipitant used in step ii) is diisopropyl ether or ethyl acetate.

7. The method according to claim 5, wherein the lignin precipitant used in step ii) comprises pressurized or supercritical $CO_2$.

8. The method according to claim 1, wherein step ii) is performed under pressurized conditions.

9. The method according to claim 1, wherein the cellulose solvent is selected from the group consisting of inorganic acids, inorganic hydroxides, organic acids, ammonia, hydrazine, ionic liquids, and solutions of at least one transition metal complex and its mixtures and mixtures of any of the aforementioned compounds.

10. The method according to claim 1, wherein the cellulose precipitant is selected from the group consisting of alkanes, ethers, esters, alcohols, aldehydes, ketones, organic acids, water, and mixtures thereof.

11. The method according to claim 1, wherein the cellulose solvent comprises phosphoric acid.

12. The method according to claim 1, wherein contacting the mixture with a lignin precipitant to obtain a precipitate in step ii) is carried out at a temperature below 50° C.

13. A method for isolating lignin comprising:
(a) contacting biomass comprising lignin and at least one of cellulose and hemicellulose with a cellulose solvent for dissolving the cellulose and/or the hemicellulose;
(b) precipitating the cellulose and/or the hemicellulose with a cellulose precipitant;
(c) removing the bulk of the cellulose and/or the hemicellulose and obtaining a slurry comprising lignin, the cellulose solvent, the cellulose precipitant, minerals, and optionally residual cellulose, hemicellulose, and/or hydrolysation products thereof, wherein the total amount of the residual cellulose, hemicellulose, and hydrolysation products thereof in the slurry is up to 1 wt. %, with respect to the dry weight of the slurry;
(d) removing the cellulose precipitant from the slurry,
(e) contacting the slurry with a lignin precipitant to obtain a lignin precipitate, removing the lignin precipitate obtained in (e) from the slurry,
(g) optionally, washing the lignin precipitate with a lignin precipitant,
(h) removing the lignin precipitant from the lignin precipitate, optionally separating the cellulose solvent and the lignin precipitant from the remaining slurry obtained in step (f);
provided that when both the cellulose precipitant and the lignin precipitant are the identical, step (d) is optional.

14. The method according to claim 13, wherein step (e) is repeated one or more times using the remaining slurry obtained in step (f).

15. The method according to claim 13, wherein the cellulose solvent obtained in step (i) is reused to dissolve lignocellulose.

16. The method according to claim 13, wherein the lignin precipitant obtained in step (h) and/or step (i) is reused in step (e) and/or a step (g).

17. The method according to claim 13, wherein the lignin precipitant used in step (e) and/or step (g) is selected from the group consisting of alkenes, ethers, esters, $CO_2$, water, and mixtures thereof.

18. The method according to claim 17, wherein the lignin precipitant used in step (e) is diisopropyl ether or ethyl acetate.

19. The method according to claim 17, wherein the lignin precipitant used in step (e) comprises pressurized or supercritical $CO_2$.

20. The method according to claim 13, wherein step (e) is performed under pressurized conditions.

* * * * *